(12) United States Patent
Yacoub (10) Patent No.: US 8,955,309 B2
(45) Date of Patent: Feb. 17, 2015

(54) METHOD FOR ADAPTING AN EXOTHERMIC REACTION IN THE EXHAUST SYSTEM OF A MOTOR VEHICLE

(75) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 762 days.

(21) Appl. No.: 13/229,563

(22) Filed: Sep. 9, 2011

(65) Prior Publication Data
US 2012/0060475 A1    Mar. 15, 2012

(30) Foreign Application Priority Data

Sep. 9, 2010   (DE) .................... 10 2010 037 431

(51) Int. Cl.
*F01N 3/00*   (2006.01)
*F01N 3/20*   (2006.01)
*F01N 11/00*  (2006.01)

(52) U.S. Cl.
CPC ............... *F01N 3/208* (2013.01); *F01N 11/002* (2013.01); *F01N 11/005* (2013.01); *F01N 2550/02* (2013.01); *F01N 2900/0601* (2013.01); *F01N 2900/1404* (2013.01); *F01N 2900/1626* (2013.01); *Y02T 10/47* (2013.01); *Y02T 10/24* (2013.01)
USPC ............... 60/295; 60/286; 60/274; 60/301; 701/114

(58) Field of Classification Search
CPC ......... F01N 3/02; F01N 3/035; F01N 3/0814; F01N 3/2066; F01N 9/002; F01N 13/02; F02D 41/0275
USPC ............ 60/274, 286, 295, 301; 701/114, 115
See application file for complete search history.

(56) References Cited

U.S. PATENT DOCUMENTS

| 5,752,382 | A  | * | 5/1998 | Hanafusa et al. ............... 60/277 |
| 5,860,277 | A  | * | 1/1999 | Schnaibel et al. .............. 60/274 |
| 6,363,713 | B1 | * | 4/2002 | Wu et al. ......................... 60/274 |
| 7,861,519 | B2 |   | 1/2011 | Fritsch |

(Continued)

FOREIGN PATENT DOCUMENTS

| DE | 4426020 A1 | 2/1996 | |
| EP | 1944494 A1 | * 7/2008 | ............ B01D 53/94 |
| WO | 2009016266 A2 | 2/2009 | |

OTHER PUBLICATIONS

"Residual (numerical analysis)," <http://en.wikipedia.org/wiki/Residual_(numerical_analysis)>, Web page last modified Dec. 16, 2011.

*Primary Examiner* — Thomas Denion
*Assistant Examiner* — Patrick Maines
(74) *Attorney, Agent, or Firm* — Julia Voutyras; Alleman Hall McCoy Russell & Tuttle LLP (57) ABSTRACT

A method for adapting a thermal model of a catalyst is provided. The method comprises adjusting an amount of exhaust gas reductant upstream of the catalyst based on a thermal model of the catalyst, the thermal model including heat input from exothermic catalyst reactions, an amount of the exothermic heat input adjusted responsive to an estimated temperature from the thermal model and a measured temperature downstream of the catalyst. In this way, a thermal model for catalyst activity and catalyst operating parameters may be adjusted to ensure optimal catalyst function.

19 Claims, 7 Drawing Sheets

(56) References Cited

U.S. PATENT DOCUMENTS

| | | | |
|---|---|---|---|
| 2006/0089783 A1* | 4/2006 | Braun | 701/114 |
| 2007/0006570 A1* | 1/2007 | Gieshoff et al. | 60/277 |
| 2007/0010020 A1* | 1/2007 | Elfvik et al. | 436/37 |
| 2008/0295489 A1* | 12/2008 | Elfvik | 60/277 |
| 2010/0047133 A1* | 2/2010 | Kako et al. | 422/105 |

* cited by examiner

METHOD FOR ADAPTING AN EXOTHERMIC REACTION IN THE EXHAUST SYSTEM OF A MOTOR VEHICLE

RELATED APPLICATIONS

This application claims priority to German Patent Application No. 102010037431.8, filed on Sep. 9, 2010, the entire contents of which being incorporated herein by reference.

FIELD

The present disclosure relates to a method for adapting an exothermic reaction in the exhaust system of a motor vehicle.

BACKGROUND AND SUMMARY

Catalytic converters may be present in the exhaust stream of motor vehicles in order to reduce the emission of pollutants produced during combustion. For example, unburnt fuel, NOx, and CO may all be converted to less toxic substrates before being released to the atmosphere.

However, as a catalyst ages, its performance may deteriorate, leading to increased emissions. To determine the age of a catalyst, the temperature of the substrate wall may first be estimated. The temperature of the substrate wall of a catalytic converter can be estimated using the measured temperature of the gas in a position upstream, the estimation of the level of unburned fuel in the exhaust gas upstream, the mass of the stored unburned fuel, the mass of stored particle material, and the thermal properties of the exhaust-gas aftertreatment element. If the temperature downstream is measured, an adaptation signal may be generated which is then used to more accurately estimate the temperature of the substrate wall.

Frequently, the adaptation signal is used directly with the energy balance of the catalyst in order to feed back the error in the estimation. Furthermore, the monitoring of the estimated increase in the exothermic temperature is compared with the situation of a damaged or aged catalytic converter and is used to prevent a state of aging being reached in which the pollutants reach a level above the defined limit value.

The inventors herein have recognized a number of issues with the above approach. First, no corrective actions regarding catalyst function are taken based on the adaptation signal. Rather, the adaptation signal is simply used to improve the estimation, and, if indicated, signal for catalyst replacement. Further, the adaptation signal does not take into account the gradual aging of the catalyst, and thus does not allow for adjustments to catalyst function over the course of the catalyst lifespan.

A method for a vehicle catalyst is provided. The method comprises if a difference between an estimated temperature and a measured temperature downstream of the catalyst is greater than a threshold, calculating an adaptation value. The method further comprises adapting the thermal model, adjusting an amount of reductant in an exhaust stream upstream of the catalyst, and indicating an aging state of the catalyst, based on the adaptation value.

In this way, the level of non-combusted fuel, or reductant, in the exhaust stream may be adjusted based on the adaptation value, and, in one example, the thermal model may be adapted by directly correcting for the energy balance of the catalyst. Finally, gradual adaptation of the thermal aging of the catalyst may be determined and accounted for, and then may be used to detect deterioration and/or absence of the catalyst.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A thermal model may be used to predict functioning of a catalyst in an exhaust stream of a vehicle. When an error in the prediction of the catalyst function based on the model is detected, such as when the prediction differs from one or more measureable parameters, such as the temperature downstream of the catalyst, an adaptation value may be calculated and used to adapt the thermal model to better predict catalyst functioning. The contribution of various factors to the detected error, such as the amount of reductant in the exhaust stream and the age of the catalyst, may be determined, and the thermal model may be adapted based on these factors. Further, one or more parameters of the catalyst may be adjusted to ensure adequate catalyst function and proper emission reduction.

Figure 1:
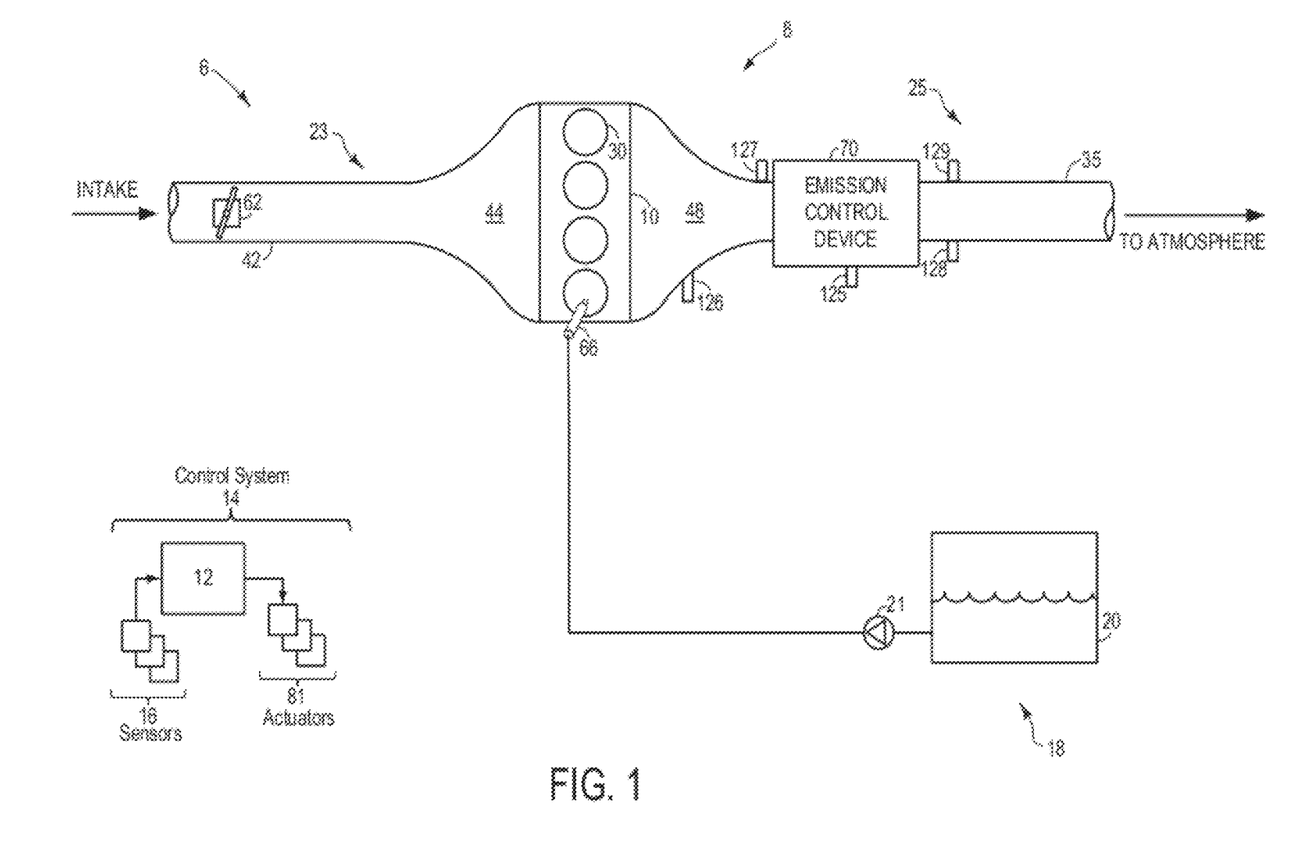
FIG. 1 shows a schematic diagram of a vehicle system.

FIG. 1 shows a schematic depiction of a vehicle system 6. The vehicle system 6 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, selective catalytic reduction (SCR) system, lean NOx trap, diesel particulate filter, oxidation catalyst, etc. Emission control device 70 may utilize reducants in the exhaust stream, such as urea or unburnt fuel, to reduce substrates such as NOx and CO in the exhaust. As such, emission control device 70 may include a reductant injector. In other embodiments, reductants may be introduced via a fuel injection system in the engine. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It can be appreciated that fuel system 18 may be a return-less fuel system, a return fuel system, or various other types of fuel system.

The fuel tank 20 may hold a plurality of fuel blends, including fuel with a range of alcohol concentrations, such as various gasoline-ethanol blends, including E10, E85, gasoline, etc., and combinations thereof.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include catalyst temperature sensor 125, exhaust gas sensor 126 and temperature sensor 127 located upstream of the emission control device, and exhaust gas sensor 128 and temperature sensor 129 located downstream of the emission control device. Other sensors such as pressure, temperature, air/fuel ratio, and composition sensors may be coupled to various locations in the vehicle system 6. As another example, the actuators may include fuel injector 66 and throttle 62. For example, the control system may receive a signal from one or more oxygen sensors in the exhaust, indicating an air-fuel ratio of the exhaust, and may be configured to adjust the amount of fuel injected to achieve a desired air-fuel ration. In some embodiments, the amount of fuel injected may be adjusted based on feedback from a catalyst thermal model, explained below, to enable optimal catalytic function.

The control system 14 may include a controller 12 comprising a computer readable storage medium comprising instructions that may be executed to carry out one more control routines. The controller may receive input data from the various sensors, process the input data, and trigger the actuators in response to the processed input data based on instruction or code programmed therein corresponding to one or more routines. Example control routines are described herein with regard to FIGS. 2-4.

Figure 2:
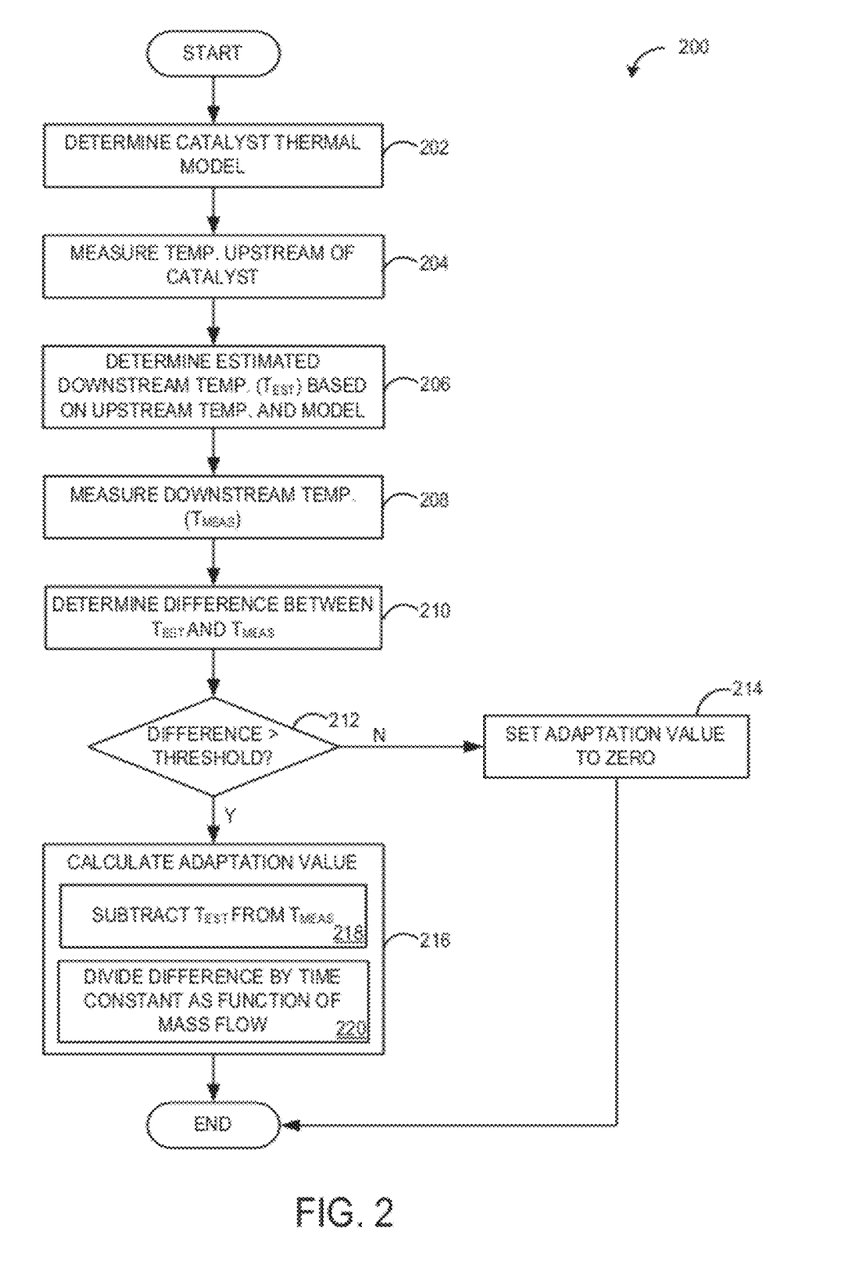
FIG. 2 shows a flow chart illustrating an example method for determining an adaptation value according to an embodiment of the present disclosure.

FIG. 2 shows a flow diagram of a method 200 for determining an adaptation value for a thermal model of a catalyst, such as emission control device 70. Method 200 may be carried out by a control system of a vehicle, such as control system 14. Method 200 comprises, at 202, determining a catalyst thermal model. The catalyst thermal model may utilize various measureable inputs to predict catalyst function, in one example a downstream catalyst temperature. Catalyst temperature may be indicative of the exothermic reactions occurring in the catalyst. The thermal model may be based on any suitable parameters, including the mass flow of exhaust through the catalyst, the age of the catalyst, the energy balance in the catalyst including heat losses and heat transfer, the amount of reductant in the exhaust, the storage capacity of the catalyst, the air-fuel ratio of the exhaust, etc. The thermal model may further account for heat input from exothermic catalyst reactions.

At 204, method 200 comprises measuring the temperature upstream of the catalyst. The upstream temperature may be determined based on a sensor upstream of the catalyst, such as sensor 127. The upstream temperature may then be used as an input in the thermal model at 206 to determine an estimated temperature, $T_{EST}$, downstream of the catalyst. The estimated downstream temperature may be subjected to a time delay and/or filtered with a low-pass filter. The time delay may take into consideration the propagation time to the position of the sensor downstream, while the low-pass filtering takes into consideration the time constant of the sensor model.

Figure 5A:
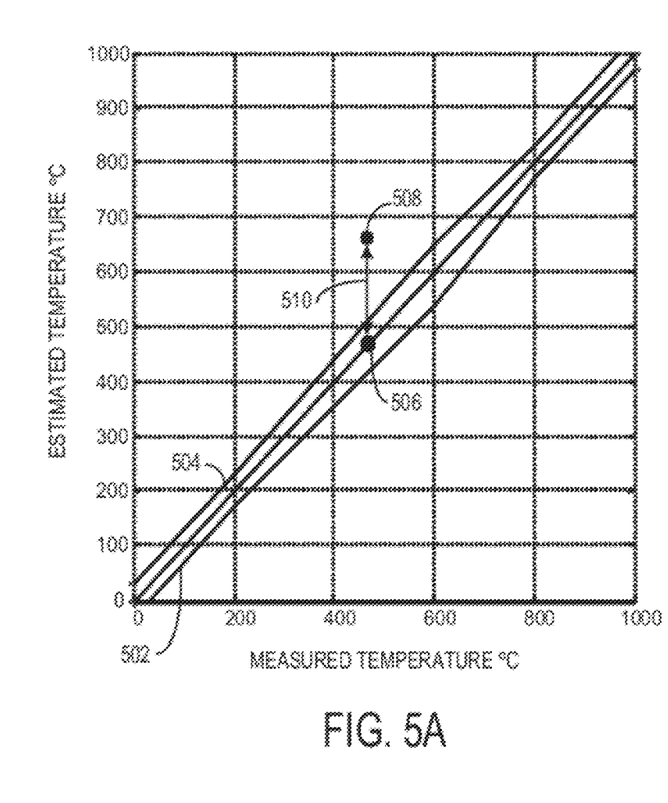
FIGS. 5A and 5B show schematic illustrations of various parameters of the adaptation value determined in FIG. 3.

At 208, the actual measured temperature downstream of the catalyst, $T_{MEAS}$, is determined by a sensor, such as sensor 129. At 210, the measured temperature is compared to the estimated temperature, and a difference between the temperature is determined. The difference is compared to threshold at 212. If the difference is not greater than a threshold, method 200 proceeds to 214 to set the adaptation value to zero. If the difference is the less than the threshold, the estimated temperature is within an acceptable margin of error, and thus the thermal model is not adapted. The threshold may be any suitable threshold. An example of the threshold limit is depicted in FIG. 5A. In FIG. 5A, the estimated temperature is depicted on the y axis while the measured temperature is depicted on the x axis. The lines 502 and 504 depict the lower and upper threshold limits, respectively, of the difference between the temperatures. The dot 506 indicates one example measured temperature and the dot 508 indicates a corresponding estimated temperature. The estimated temperature is outside the upper threshold limit, and as a result a difference signal between the estimated and measured temperatures, 510, may be calculated and used to determine an adaptation value, described below with respect to FIG. 2.

Figure 5B:
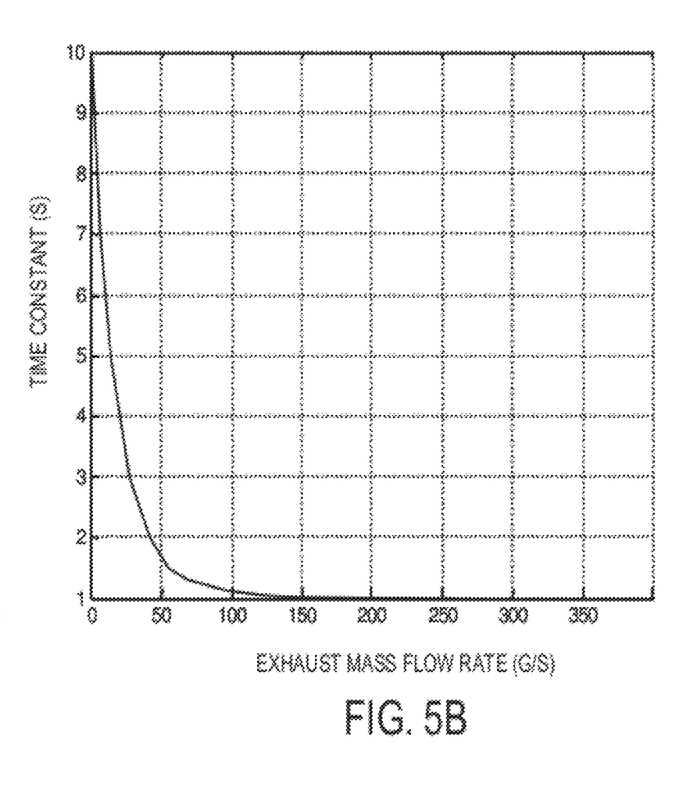

Returning to FIG. 2, if the difference between the estimated and measured temperature is greater than the threshold, method 200 proceeds to 216 to calculate an adaptation value. The adaptation value is calculated by subtracting $T_{EST}$ from $T_{MEAS}$ at 218. In some embodiments, the difference between the estimated temperature and the respective closest threshold limit, as shown in FIG. 5A, may be used instead of the measured temperature. At 220, the determined difference is divided by a time constant. The time constant is determined as a function of the mass flow of exhaust through the catalyst, as shown by FIG. 5B. Under conditions of slow throughput through the catalyst, the time constant is higher, allowing for slower adaptation. On the other hand, when the throughput through the catalyst is high, the time constant is lower, allowing for faster adaptation. After determining the adaptation value, method 200 ends.

Thus, method 200 provides for determining an adaptation value based on a difference between an estimated and measured temperature downstream of the catalyst. When the estimated temperature is different from the measured temperature by a large enough amount, it indicates an error in the thermal model. Additionally, it indicates that the catalyst is not functioning as predicted. Accordingly, the thermal model may be adapted to reduce the error and better predict catalyst functioning. Further, one or more operating parameters of the catalyst may be adjusted to ensure adequate reduction of exhaust constituents.

Figure 3:
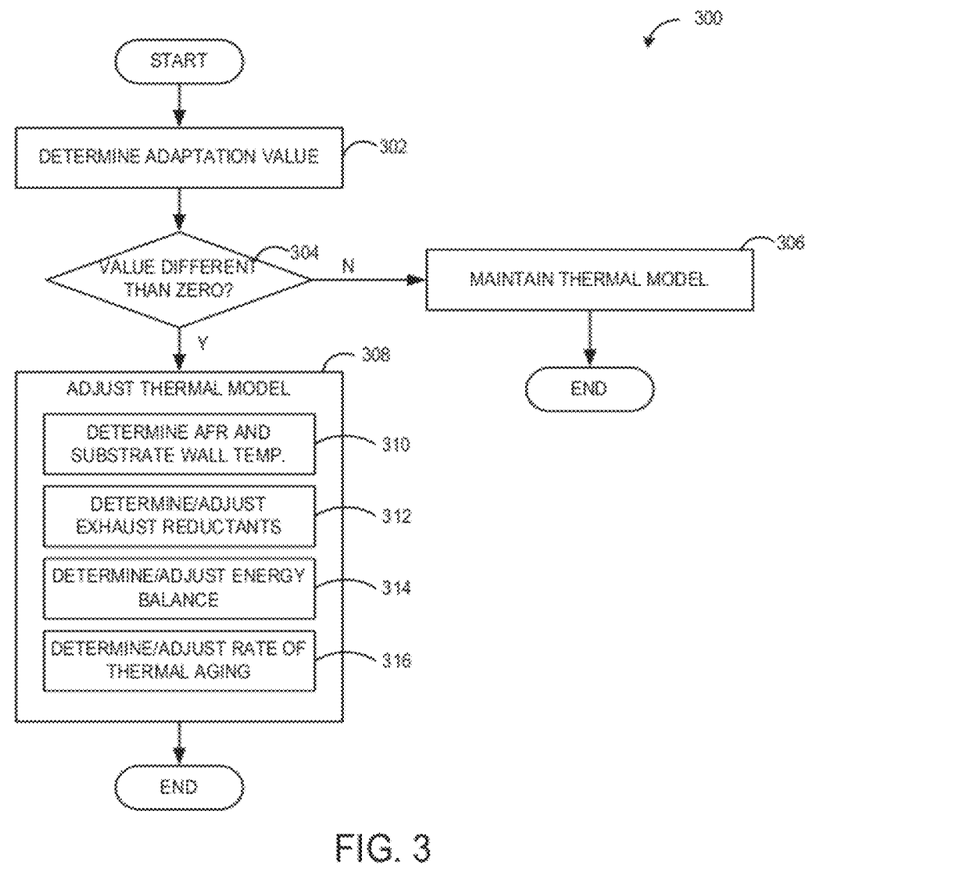
FIG. 3 shows a flow chart illustrating an example method for adapting a thermal model according to an embodiment of the present disclosure.

FIG. 3 depicts a method 300 for adapting a thermal model of a catalyst, based on a determined adaptation value. Method 300 may be carried out by a control system of a vehicle. Method 300 comprises, at 302, determining an adaptation value. The adaptation value may be determined based on the measured and estimated temperatures downstream of the catalyst, as described with respect to FIG. 2. At 304, it is determined if the adaptation value is different than zero. As explained above with respect to FIG. 2, when the difference between the estimated and measured temperatures is not greater than a threshold amount, the adaptation value is set to zero. Thus, if it is determined at 304 that the adaptation value is not different than zero, method 300 proceeds to 306 to maintain the thermal model without adjustments, as the model is adequately accurate in predicting the downstream temperature. If the adaptation value is different than zero, method 300 proceeds to 308 to adjust the thermal model.

The thermal model may inaccurately predict the temperature downstream of the catalyst. Various factors may account for the inaccuracy, and the relative contribution of these factors to the error in the model may be based on the air-fuel ratio and/or substrate wall temperature of the catalyst. At 310, method 300 comprises determining the air-fuel ratio and substrate wall temperature of the catalyst. The air-fuel ratio (AFR) may be determined either upstream or downstream of the catalyst, or may be determined at both locations. The air-fuel ratio may be determined by one or more oxygen sensors in the exhaust, such as sensors 126 and 129. The temperature of the catalyst substrate wall may be estimated based on the measured downstream temperature, mass flow through the catalyst, storage capacity of the catalyst, etc., or may be directly determined by a temperature sensor in the catalyst.

Figure 6:
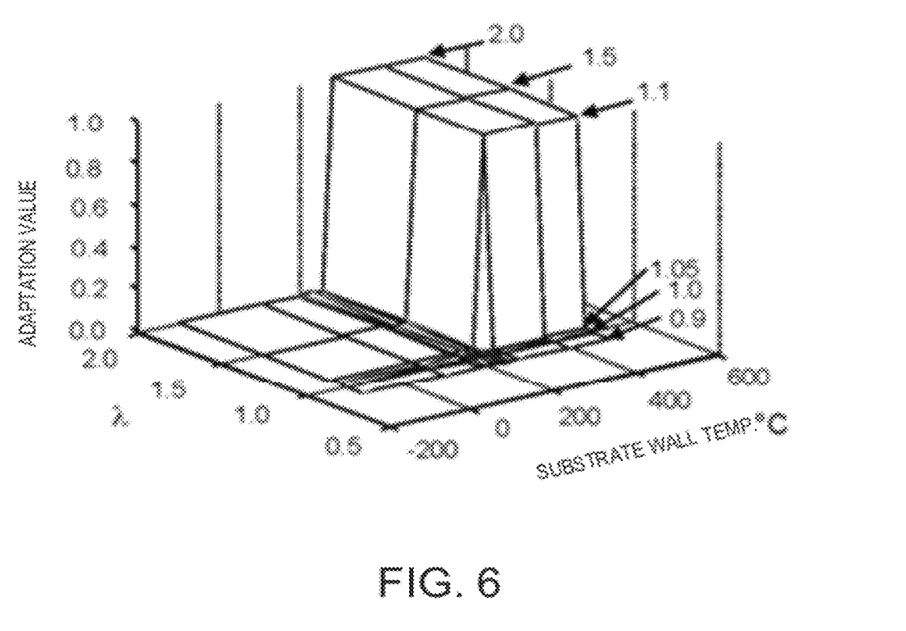
FIGS. 6-8 show example diagrams illustrating factors contributing to the thermal model.

At 312, the contribution of the amount of reductant in the exhaust stream upstream of the catalyst is determined, and the model adjusted accordingly. The contribution may be determined based on the substrate wall temperature and the air-fuel ratio, as determined by the graph illustrated in FIG. 6. The concentration of unburned fuel in the exhaust is the dominant factor for the estimated wall temperature, when it is higher than the catalyst light-off temperature, and for air-fuel ratios (lambda) in the exhaust gas greater than 1. This serves to ensure that the correction of the reducing agent in the inflowing gas actively adapts the exothermic reaction by combustion in the catalyst, and therefore the condition of the wall temperature and the state of the lambda value. FIG. 6 plots a scaled adaptation signal versus the temperature of the substrate in ° C. and versus the lambda value. For example, at a substrate temperature of 200° C. and an air-fuel ratio of 1.1, the scaled adaptation value is approximately 0.8. Thus, 80% of the error in estimating the downstream temperature may result from an error in the amount of reductant in the exhaust stream. The model may be adjusted to reflect this, and/or the actual amount of reductant in the exhaust stream may be adjusted to bring the actual temperature closer the estimated temperature. In one embodiment, the amount of reductant in the exhaust stream may be adjusted by adjusting an amount and/or timing of fuel injected into one or more cylinders of the engine. In another embodiment, the amount of reductant in the exhaust stream may be adjusted by adjusting an amount of urea injected by an SCR system.

Figure 7:
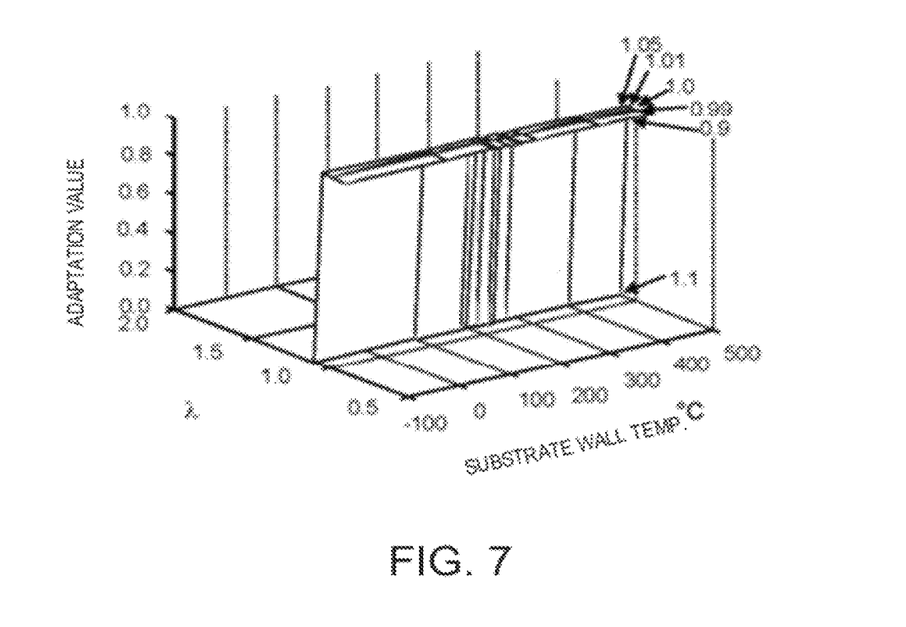

At 314, the contribution of the energy balance in the catalyst may be determined. The energy balance may comprise the heat into the catalyst as well as the heat out of the catalyst, and may take into account the exothermic reactions occurring in the catalyst and any heat losses, such as heat loss to the air surrounding the catalyst, for example. That is, the energy balance may comprise all factors contributing to the heat produced in the catalyst excluding the reductant concentration. While the amount of reductant in the exhaust is the major contributor to the adaptation value when lambda is above 1 and the catalyst temperature is above light-off temperature, for lambda values below 1.05, the energy balance in the catalyst is the major contributor to the adaptation value, regardless of substrate temperature. The contribution may be determined based on the air-fuel ratio and substrate temperature, as shown in FIG. 7. In one example, if the substrate wall temperature is 200° C. and the air-fuel ratio is 0.9, the scaled adaptation value is approximately 0.7. Based on this, the thermal model may be adapted to adjust the energy balance.

Figure 8:
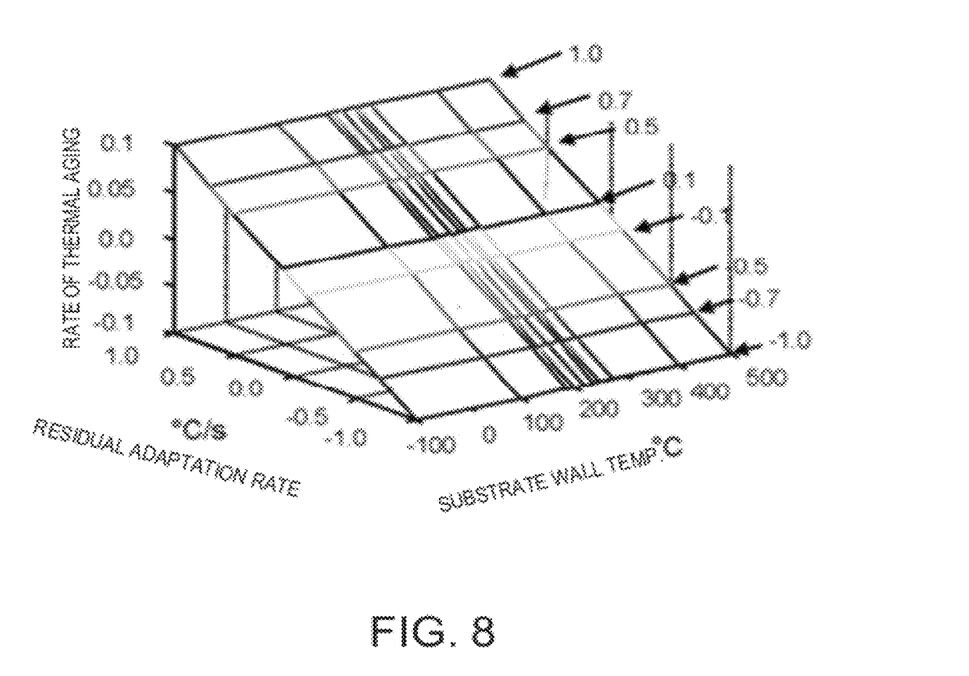

At 316, a rate of thermal aging is determined. The rate of thermal aging comprises how quickly the catalyst activity is deteriorating due to the thermal cycling of the catalyst. Any error in the thermal model not accounted for by the reductants and energy balance may be caused by the aging of the catalyst. The rate of aging of the catalyst is thus determined by the residual adaptation value (whereby the contributions of the reductant concentration and energy balance have been subtracted from the original adaptation value) and substrate wall temperature, as shown in FIG. 8. The adaptation rate in 1/s is plotted versus the substrate temperature in ° C. and versus the remaining adaptation value in ° C./s.

Figure 4:
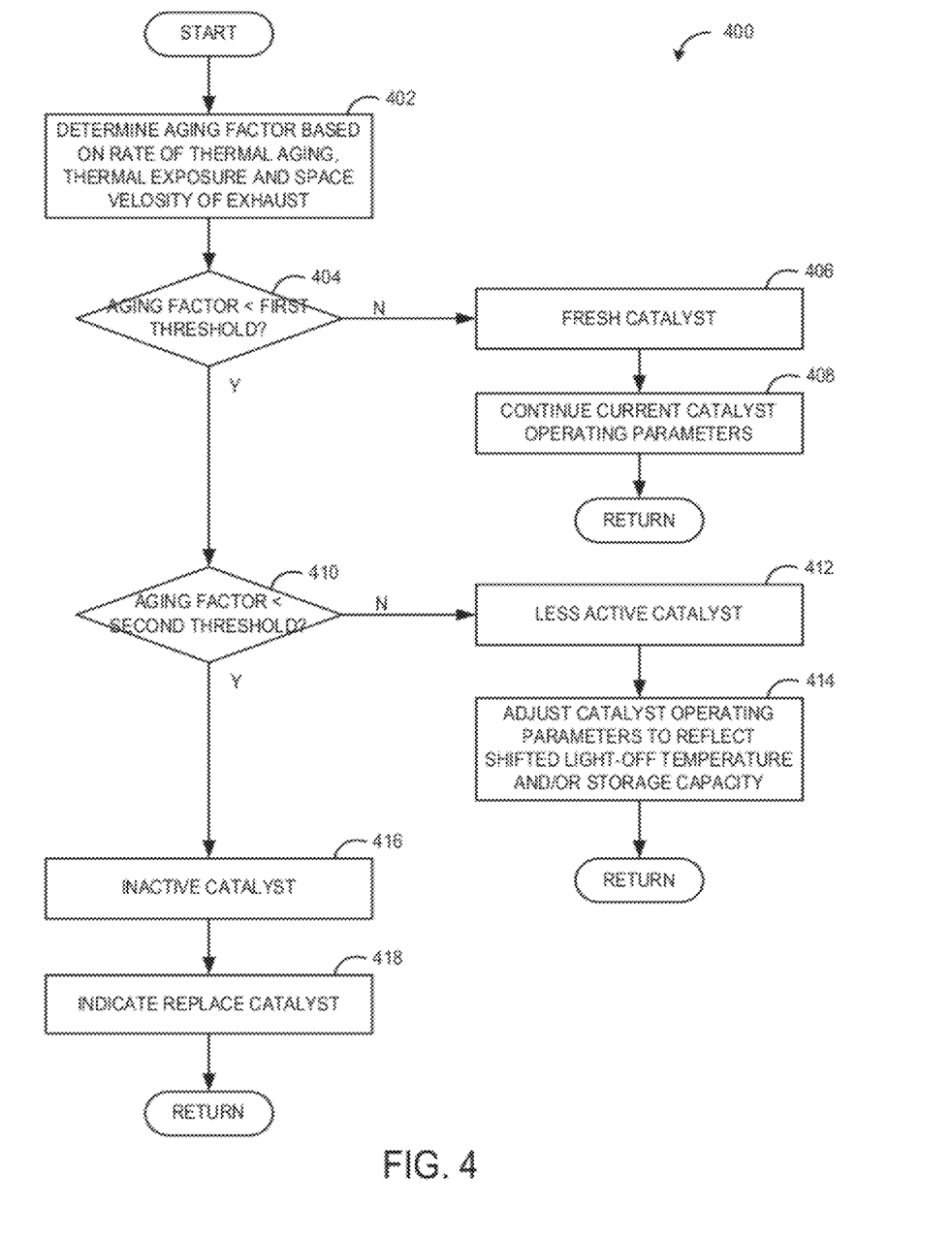
FIG. 4 shows a flow chart illustrating an example method for determining an aging state of a catalyst according to an embodiment of the present disclosure.

Method 300 thus determines the contribution of various factors to the adaptation value determined by method 200. Based on this, these factors may be adapted in the thermal model. Additionally, for the reductant concentration in the exhaust stream, the amount of reductant may be altered to bring the measured temperature closer to the estimated temperature. The rate of thermal aging of the catalyst may also be used to determine an aging state of the catalyst. FIG. 4 is a flow chart depicting a method 400 for indicating an aging state of a catalyst.

Method 400 comprises, at 402, determining an aging factor. The aging factor is determined based on the rate of thermal aging discussed above with respect to FIG. 3. The aging factor is additionally based on parameters of the exhaust flow through the catalyst, including thermal exposure of the exhaust and space velocity of the exhaust, or the flow rate per volume of the catalyst. In some embodiments, the aging factor is calculated by integrating the summation of a nominal rate of the thermal aging. The nominal rate of the thermal aging is a function of the thermal loading, the spatial velocity of the exhaust gas, and the calculated adaptation rate of the thermal aging, which may be calculated as discussed above with respect to FIG. 3.

The thermal aging factor is then used for monitoring a catalytic performance of the catalyst. At 404, method 400 comprises determining if the aging factor is less than a first threshold. The first threshold may be any suitable threshold that indicates an active catalyst. In the embodiment described above, wherein the aging factor is calculated by integrating the summation of the nominal rate of thermal aging, the first threshold may be one. If it is determined at 404 that the aging factor is not less than the first threshold, method 400 proceeds to 406 to set the aging state of the catalyst as a fresh catalyst. As a result, at 408, current catalyst operating parameters may be maintained. For example, there may be no shift in catalyst parameters affected by catalyst age, such as light-off temperature or oxygen storage capacity, due to the catalyst being fresh. Fuel injection amounts and regeneration frequency may thus be maintained. However, if it is determined at 404 that the aging factor is less than the first threshold, method 400 proceeds to 410 to determine if the aging factor is less than a second threshold. The second threshold may be any suitable threshold, less than the first threshold, that indicates no or very little catalyst activity. For example, if the first threshold is one, the second threshold may be 0.5, or may be 0.2.

If the aging factor is not less than the second threshold, method 400 proceeds to 412 to set the aging state of the catalyst to a less active catalyst. In a less active catalyst, the catalyst does not have as much catalytic activity as a fresh catalyst, but may still be able to suitably reduce vehicle emissions. Certain parameters of the catalyst, such as the light-off temperature and storage capacity, may change as the catalyst ages and reduces activity. Thus, at 414, method 400 comprises adjusting catalyst operating parameters to reflect the shifted parameters, including the light-off temperature and storage capacity. For example, in a less active catalyst, the oxygen storage capacity may be reduced and the light-off temperature may increase. As a result, the frequency of regeneration events (periods of elevated catalyst temperature to burn off stored particles in the catalyst) may be increased, and the amount of fuel injected to reach the light-off temperature may be increased, for example.

If it is determined at 410 that the aging factor of the catalyst is below the second threshold, method 400 proceeds to 416 to set the aging state of the catalyst to no catalyst. In this state, the catalyst may not be active enough to provide adequate oxidation and reduction to purify the exhaust gas. As a result, at 418, a replace catalyst message may be indicated to a vehicle operator. In embodiments where the catalyst is an SCR system, an aging factor below the second threshold may indicate a lack of reductant injected into the system (e.g. no urea being injected) and thus 418 may comprise indicating to a vehicle operator to refill a reductant tank.

Thus, method 400 provides for calculating an aging factor based on the determined rate of thermal aging of the catalyst. This factor can be used to determine the relative age of the catalyst, and if indicated, used to adjust operating parameters of the catalyst to ensure optimal catalyst activity. If the aging factor is low enough, an indication to replace the catalyst may be given. In this way, gradual aging of the catalyst may be determined and accounted for, enabling full catalyst activity over the period of catalyst aging.

The methods described above with respect to FIGS. 2-4 provide for a method for adapting a thermal model of a catalyst, comprising, if an estimated temperature downstream of the catalyst is different from a measured temperature downstream of the catalyst, adapting the thermal model to produce an estimated temperature similar to the measured temperature. Adapting the thermal model comprises determining an adaptation value based on the temperature difference, determining a contribution to the adaptation value of an amount of reductant in an exhaust stream upstream of the catalyst, determining the contribution to the adaptation value of an energy balance of the catalyst, and determining a contribution to the adaptation value of a rate of aging of the catalyst. The method also comprises utilizing the rate of aging of the catalyst to determine a catalyst aging state and, if the catalyst aging state is below a threshold, adjusting one or more parameters of the catalyst to control exhaust emissions.

The methods of FIGS. 2-4 also provide a method for a vehicle catalyst, comprising adjusting an amount of exhaust gas reductant upstream of the catalyst based on a thermal model of the catalyst, the thermal model including heat input from exothermic catalyst reactions, an amount of the exothermic heat input adjusted responsive to an estimated temperature from the thermal model and a measured temperature downstream of the catalyst.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle catalyst, comprising:
    if a difference between an estimated temperature and a measured temperature downstream of the catalyst is greater than a threshold, calculating an adaptation value, the estimated temperature downstream of the catalyst based on a thermal model; and
    adapting the thermal model, injecting an adjusted amount of reductant in an exhaust stream upstream of the catalyst, and indicating an aging state of the catalyst based on the adaptation value.

2. The method of claim 1, further comprising, if the difference between the estimated temperature and the measured temperature is not greater than a threshold, setting the adaptation value to zero.

3. The method of claim 1, further comprising determining a thermal aging rate of the catalyst based on the adaptation value, and using the thermal aging rate to determine the aging state of the catalyst.

4. The method of claim 3, further comprising:
    determining an aging factor of the catalyst based on the thermal aging rate and thermal exposure and space velocity of the exhaust stream in the catalyst;
    if the aging factor is above a first threshold, indicating a fresh catalyst;
    if the aging factor is less than the first threshold but above a second threshold, indicating a less active catalyst; and
    if the aging factor is below the second threshold, indicating an inactive catalyst.

5. The method of claim 4, further comprising if a less active catalyst is indicated, adjusting one or more catalyst operating parameters based on a shifted catalyst light-off temperature and/or a shifted storage capacity of the catalyst.

6. The method of claim 1, wherein the adaptation value comprises the difference between the estimated temperature and the measured temperature divided by a time constant, the time constant a function of a mass flow of the exhaust stream through the catalyst.

7. The method of claim 1, wherein the thermal model comprises an energy balance of energy in and out of the catalyst, the amount of reductant in the exhaust upstream of the catalyst, a temperature of the catalyst, a storage capacity of the catalyst, an air-fuel ratio upstream and/or downstream of the catalyst, and a rate of thermal aging of the catalyst.

8. The method of claim 7, wherein adapting the thermal model further comprises adjusting a contribution to the thermal model of the amount of reductant in the exhaust stream upstream of the catalyst, the energy balance, and the rate thermal aging of the catalyst.

9. A vehicle system, comprising:
    an engine having an exhaust passage;
    a catalyst coupled to the exhaust passage; and
    a control system comprising a computer readable storage medium comprising instructions for:
        determining an estimated temperature downstream of the catalyst based on a thermal model;
        comparing the estimated temperature to a measured temperature downstream of the catalyst;

if a difference between the estimated temperature and the measured temperature is greater than a threshold, calculating an adaptation value; and adapting the thermal model, adjusting an amount of reductant in an exhaust stream upstream of the catalyst, and determining an aging state of the catalyst based on the adaptation value.

10. The system of claim 9, wherein the reductant comprises unburnt fuel, and wherein adjusting the amount of reductant in the exhaust stream further comprises adjusting an amount and/or timing of fuel injected into one or more cylinders of the engine.

11. The system of claim 9, wherein the catalyst comprises a selective catalytic reduction (SCR) system, and wherein adjusting the amount of reductant in the exhaust stream further comprises adjusting an amount of urea injected by the SCR system.

12. The system of claim 9, wherein calculating the adaptation value further comprises calculating an adaptation value based on the difference between the estimated and measured downstream temperature and further based on a mass flow of exhaust through the catalyst.

13. The system of claim 9, wherein the aging state of the catalyst is based on an aging factor of the catalyst, the aging factor based on a thermal aging rate and thermal exposure and space velocity of the exhaust stream in the catalyst.

14. A method for a vehicle catalyst, comprising:

injecting an adjusted amount of exhaust gas reductant upstream of the catalyst based on a thermal model of the catalyst, the thermal model including heat input from exothermic catalyst reactions, an amount of the exothermic heat input adjusted responsive to an estimated temperature from the thermal model and a measured temperature downstream of the catalyst, wherein the amount of the exothermic heat input adjusted responsive to the estimated temperature from the thermal model and the measured temperature downstream of the catalyst further comprises adjusting the amount of exothermic heat input based on a mass flow of exhaust through the catalyst.

15. The method of claim 14, wherein adjusting the amount of exhaust gas reductant upstream of the catalyst further comprises adjusting the amount of exhaust gas reductant upstream of the catalyst as a function of an air-fuel ratio upstream and/or downstream of the catalyst and a substrate wall temperature of the catalyst.

16. The method of claim 14, wherein the amount of the exothermic heat input adjusted is a function of the air-fuel ratio upstream and/or downstream of the catalyst and the substrate wall temperature.

17. The method of claim 14, further comprising determining a rate of aging of the catalyst based on the estimated temperature from the thermal model, the measured temperature downstream of the catalyst, the amount of reductant in the exhaust stream upstream of the catalyst, and the exothermic heat input.

18. The method of claim 17, further comprising indicating a catalyst aging state as a function of the rate of aging of the catalyst and a thermal exposure and space velocity of exhaust in the catalyst.

19. The method of claim 18, further comprising adjusting a fuel injection amount and/or timing based on the indicated catalyst aging state.

* * * * *